Sept. 6, 1966 W. H. COULTER 3,271,671
PARTICLE ANALYZING DEVICE
Original Filed April 6, 1961
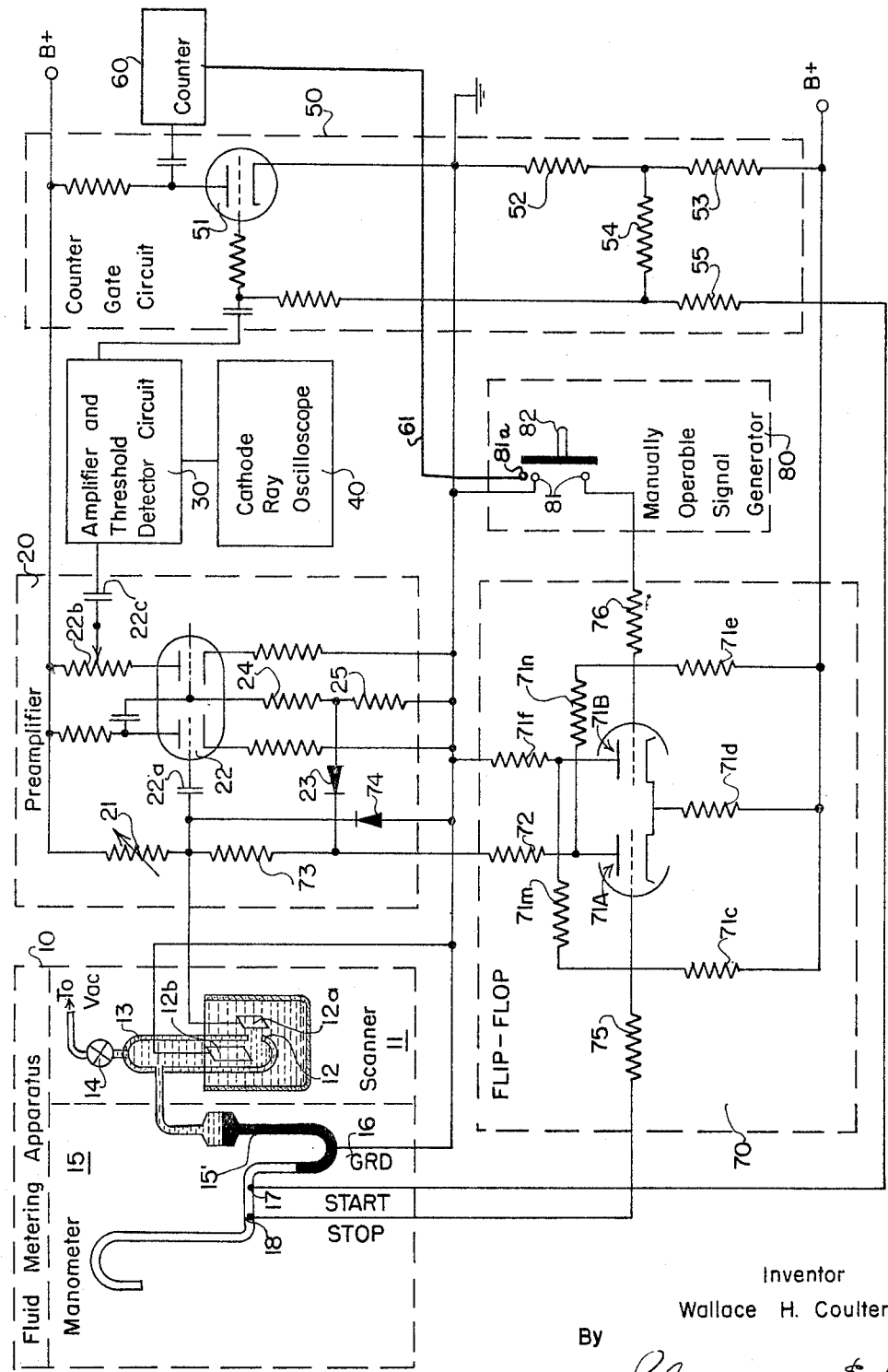
Inventor
Wallace H. Coulter
By
*Silverman & Cass*
Attys.

United States Patent Office 3,271,671
Patented Sept. 6, 1966

3,271,671
PARTICLE ANALYZING DEVICE
Wallace H. Coulter, Miami Springs, Fla., assignor to Coulter Electronics, Inc., Chicago, Ill.
Original application Apr. 6, 1961, Ser. No. 101,289. Divided and this application Aug. 16, 1965, Ser. No. 479,907
20 Claims. (Cl. 324—71)

This application is a division of application Serial No. 101,289 filed April 6, 1961, now abandoned.

This invention relates to a novel control circuit for use with a fluid suspended particle studying or analyzing device wherein the volume of the fluid in which the scanned particles are suspended must be accurately metered.

The apparatus of the preferred embodiment of this invention utilizes the structure and principles disclosed and claimed in U.S. Patent No. 2,656,508 to Wallace H. Coulter and in U.S. Patent No. 2,869,078 to Wallace H. Coulter and Joseph R. Coulter, Jr.

The principal object of this invention is to provide economical means for controlling the operation of a particle studying device incorporating a fluid suspended particle scanner to facilitate precise analysis of the particles suspended in an accurately metered volume of fluid.

Many additional advantages and objects will be more clearly understood from a detailed description of the preferred embodiment set forth below. The drawing is primarily diagrammatic and symbolic in nature in order to keep the description concise and intelligible as those skilled in the art are familar with many of the particle analyzing devices whose structures are suitable for constructing the combinations to be described.

The drawing is a schematic diagram of a particle studying device and metering apparatus incorporating a preferred embodiment of the invention.

The circuit of the preferred embodiment illustrated in the drawing comprises a fluid metering apparatus 10, a preamplifier 20, an amplifier and threshold detector circuit 30, a cathode ray oscilloscope 40, a counter gate circuit 50, a counter 60, a flip-flop 70 and a manually operable signal generator 80.

The fluid metering apparatus 10 may be of the type described in U.S. Patent No. 2,869,078, noted above, and the reader is referred to that patent for a complete description of its structure and method of operation as it is incorporated into the embodiment to be described.

The metering apparatus 10 comprises two main sections. The first section is a scanner section 11 having an aperture 12 through which pass the fluid and the scanned particles suspended in the fluid, and a pair of scanner electrodes 12a and 12b which form part of the circuit which detects the presence of or scans the particles passing through the aperture 12. The aperture is located in the sidewall of a tube 13 which is connected to a source of vacuum through a valve 14 and to the second section of the metering apparatus, a manometer 15.

The reader is referred to U.S. Patent No. 2,656,508 for a complete description of the principles of scanning fluid suspended particles passing through an aperture of the type described.

The manometer 15 comprises a metering tube 15′, preferably of the construction shown in U.S. Patent No. 2,869,078 containing a liquid such as mercury, a ground electrode 16, a start electrode 17 and a stop electrode 18. In the preferred embodiment, the ground electrode 16 is always in contact with the mercury. The sensing points of the start and stop electrodes are located along a horizontal portion of the metering tube 15′, their separation being a function of the volume of fluid it is desired to draw through the aperture 12 during an analytic run.

The fluid metering apparatus is operated in the following manner. The valve 14 is opened to connected the vacuum supply to the inside of the tube 13. The pressure differential between the inside and the outside of the tube 13 causes the fluid surrounding the outside of the tube 13 to flow through the aperture 12 in its sidewall. Simultaneously, the mercury in the metering tube 15′ is drawn toward the vacuum supply which is carefully adjusted so that the head of the mercury remains within the reservoir portion of the metering tube 15′. The volume of mercury within the metering tube has been chosen so that in this condition the lower end or tail of the mercury column is drawn above the sensing points of both the start and stop electrodes.

To perform an analytic run, the operator closes the valve 14 to disconnect the vacuum supply from the interior of the tube 13. The mercury column within the metering tube 15′ recedes to its equilibrium position with its tail intersecting first the sensing point of the start electrode 17 and then the sensing point of the stop electrode 18. As the metering tube 15′ is in series hydraulic connection with the aperture 12, the volume between the two sensing points within the metering tube is a function of the volume of fluid which will be scanned through the aperture 12 as the tail traverses the portion of the metering tube between the sensing points. Signals generated by the tail of the mercury column passing the sensing points may be transmitted to other parts of the analyzing device, as will be described, to limit the operation of the analyzer to the times when a metered volume of fluid is being scanned.

When the mercury reaches its equilibrium position, the fluid flow through the scanner aperture 12 stops. In order to perform a second run, the valve 14 must open so as to cause the tail of the mercury column to be drawn above the start electrode 17 and then closed as described above.

The scanner electrodes 12b and 12b may be energized by connecting electrode 12b to ground and connecting electrode 12b to a B+ supply through a resistor 21 having a high resistance which may be varied to adjust the current flowing in the scanner electrode circuit. The B+ supply may be a source of d.c. voltage having a potential of about +250 volts with respect to ground. The signals generated by the scanning of particles are transmitted from the scanner electrodes 12a and 12b to tube 22, connected as an R-C coupled amplifier, through d.c. blocking capacitor 22a for amplification.

The amplified signals appear at the slider of gain control potentiometer 22b in the plate circuit of the second section of the tube 22 and are transmitted through capacitor 22c to the input of the amplifier and threshold level detector circuit 30.

The function of the amplifier and threshold level detector circuit 30 is to generate a count pulse each time the amplitude of an input signal pulse received from the preamplifier 20 exceeds a threshold level which is determined by the operator. The circuit 30 may also amplify the input signals and transmit them to the cathode ray oscilloscope 40 where they may be visually observed.

The count pulses are transmitted to the counter gate circuit 50 which operates in response to a signal from the start electrode 17 to either amplify the count pulses and transmit them to the counter 60 or to block the count pulses so that no signal is transmitted to the counter.

The counter 60 may be of the type which registers a count for each count pulse applied to its input. It may be a mechanical register, an electronic counter or a combination of both. In this manner, the counter will register the number of pulses having amplitudes in excess of the threshold level. This number is equal to the number of scanned particles whose sizes exceed the size determined by the corresponding threshold level.

By varying the threshold level and recording the number of counts which are registered for each threshold level setting, the operator can determine the size distribution of the sample of particles which have been scanned.

The analyzing device is programmed so that count pulses can reach the counter only when the tail of the mercury column is traversing the section of the metering tube 15' between the sensing points of the start electrode 17 and the stop electrode 18. This assures that the volume of fluid scanned during each analytic run remains constant, as explained in U.S. Patent No. 2,869,078. The analyzing device is also programmed to transmit scanning signals from the scanner electrodes 12a and 12b to the cathode ray oscilloscope 40 prior to the commencement of an analytic run so that the operator can view the visual display of the signals to determine whether the pattern is normal or whether there is an aperture blockage caused by debris or some other abnormality.

As stated above, after the mercury in the metering tube 15' reaches its equilibrium position at the end of an analytic run, the fluid flow through the aperture 12 stops as there is no longer any pressure differential between the inside and the outside of the tube 13. The electric current density in the fluid path through the aperture 12 is very high and the heat dissipating capacity of the mass surrounding the fluid path in aperture is insufficient to prevent the undesirable effects of overheating. In the case where blood cells suspended in physiological saline are scanned, the overheating causes the boiling of the saline and the subsequent destruction of the blood cells in the vicinity of the aperture. The destroyed blood cells become debris which adversely affect the accuracy of the analysis. It is therefore necessary to provide means for terminating the electric current flow in the scanner electrode circuit when the fluid flow through the aperture ceases. This function is also programmed into the control circuit of the analyzing device.

Control of the energization of the scanner electrodes 12a and 12b and the transmission state of the counter gate circuit 50 is exercised by the flip-flop 70 in response to signals received from the manometer 15 and the manually operable signal generator 80.

The flip-flop 70 comprises a pair of triodes 71A and 71B, bias resistors 71c, 71d, 71e and 71f, and switching resistors 71m and 71n. The elements of the flip-flop 70 having the reference numeral 71 are connected in the well-known manner to produce the electrical effects characteristic of such devices, which may be described as binary.

The output circuit of the flip-flop 70 comprises the plate of triode 71A, resistor 72, resistor 73 and diode 74.

The first input circuit of the flip-flop 70 comprises the grid of triode 71A and resistor 75. The second input circuit of the flip-flop 70 comprises the grid of triode 71B and resistor 76.

The output circuit of the binary flip-flop 70 can assume either a high impedance or a low impedance state. It is in its high impedance state when there is no current flowing through the triode 71A because it is biased to cut-off. It is in its low impedance state when current is flowing in the triode 71A because it is biased to conduction.

It should be noted that the plate circuit of the flip-flop 70 is connected to ground through the output circuit and that the cathode circuit connected to the B— supply which is a D.C. voltage source supplying a potential of about —275 volts.

The grounding of the first input circuit, when the output circuit is in its high impedance state, causes the flip-flop 70 to switch its output circuit into the low impedance state. This occurs when the tail of the mercury column passes the sensing point of the stop electrode 18.

Similarly, the grounding of the second input circuit, when the output circuit is in its low impedance state, causes the flip-flop to switch its output circuit into its high impedance state. This occurs when the switch contacts 81 of the manually operable signal generator 80 are shorted.

The output circuit of the flip-flop has no effect on the scanner electrode circuit when it is in its high impedance state as the diode 74 is back-biased and the resistance of the circuit comprising resistors 72 and 73 is very high. However, when the output circuit is in its low impedance state, current flows in the circuit from ground through the diode 74, resistors 73 and 72, the triode 71A and resistor 71d to the B— supply.

Because it is forward biased now, the voltage across the diode 74 and the scanner electrodes 12a and 12b, is almost zero. A small voltage drop remains across the electrodes 12a and 12b because of the work potential drop across the material in the diode 74 but the current flowing through the aperture 12 because of this is too small to cause overheating.

A diode 23 is connected between the junction of resistors 72 and 73 and the junction of bias resistors 24 and 25, which provide grid bias to the second section of the preamplifier tube 22, to bias the second section of tube 22 to cut-off when the output circuit is in its low impedance state. This feature is added to prevent spurious signals from being transmitted to the counter 60 after the end of an analytic run.

The counter gate circuit 50 comprises a triode 51 connected as an R-C coupled amplifier. Its grid bias network, comprising resistors 52, 53, 54 and 55, switches the tube from cut-off to conduction in response to a signal received from the start electrode 17.

Before the tail of the mercury column passes the sensing point of the start electrode 17, a large negative grid bias obtained from the voltage divider, resistors 52 and 53, connected between ground and the B— supply biases tube 51 to cut-off so that no count pulses are transmitted to the counter 60. When the tail of the mercury passes the sensing point of the start electrode 17, thereby connecting the start electrode to the ground electrode 16, the bias voltage at the junction of resistors 54 and 55 becomes more positive and the tube 51 goes into its amplification state.

The circuit is operated in the following manner. The valve 14 is opened and the fluid commences to flow through the aperture 12 in response to the pressure differential between the inside and the outside of the tube 13. The mercury column is also drawn toward the vacuum supply until its tail is above the sensing point of the start electrode.

Next the operator pushes the button 82 of the manually operable signal generator 80 to short the contacts 81. This causes the output circuit of the flip-flop 70 to assume its high impedance state. A counter reset signal is also transmitted to the counter 60 via contact 81a and channel 61 to reset the counter indicators to zero.

After observing that the signal pulses displayed on the screen of the cathode ray oscilloscope 40 are normal, the operator closes the valve 14. The mercury column recedes to its equilibrium position. First its tail passes the sensing point of the start electrode 17 which causes the counter gate circuit 50 to go from its blocking to its amplifying state. The count pulses which are generated by the threshold detector circuit 30 now are amplified and transmitted to the counter 60 where they are registered.

After a predetermined volume of fluid is scanned, the tail of the mercury column passes the sensing point of the stop electrode 18 which causes the flip-flop 70 to switch its output circuit to its low impedance state. The electrodes 12a and 12b are now de-energized and the preamplifier tube 22 is biased to cut-off so that no more signals can be transmitted to the amplifier and detector circuit 30.

The mercury column finally arrives at its equilibrium position and the fluid stops flowing through the aperture of the scanner. The operator records the numbers appearing on the face of the counter 60, adjusts the threshold level to a new value and repeats the above procedure.

It is believed that the invention is sufficiently described to enable those skilled in the art to understand its method of use and manner of operation. Accordingly, no further details are believed to be necessary.

Obvious variations and changes in the circuitry and structure are capable of being made, such as the substitution of transistors for tubes and the use of other types of fluid metering apparatus, without departing from the spirit or scope of the invention as defined in the appended claims.

What is desired to be claimed by Letters Patent of the United States is:

1. A particle analyzer, for studying particles suspended in a fluid, comprising:
  (a) fluid suspended particle scanning means for generating electric scanner signals, each signal having a parameter which is a function of a physical property of a respective scanned particle, incorporating
    (i) a pair of scanner electrodes,
    (ii) means for metering the volume of fluid scanned during the period of an analytic run,
    (iii) means for generating a start signal at the beginning of an analytic run, and
    (iv) means for generating a stop signal at the end of an analytic run;
  (b) means for analyzing the scanner signals;
  (c) manually operable signal generating means;
  (d) means for energizing the scanner electrodes in response to a signal received from the manually operable signal generating means and for de-energizing the scanner electrodes in response to a stop signal received from the stop signal generating means; and
  (e) means for activating the analyzing means in response to a signal received from the start signal generating means
whereby the generation of a start signal causes activation of the analyzing means and the generation of a stop signal causes de-energization of the scanner electrodes so that the scanner electrodes are energized only before and during the period of an analytic run when a metered volume of fluid is being scanned.

2. The apparatus of claim 1 wherein the manually operable signal generating means comprise:
  (a) a source of electromotive potential; and
  (b) a manually operable binary switch in circuit with the source
whereby an operator can select one of two signal potentials for transmission to the means for energizing and de-energizing the scanner electrodes.

3. The apparatus of claim 1 wherein the means for energizing and de-energizing the scanner electrodes comprise:
  a binary flip-flop having:
    (i) an output circuit connected in parallel circuit with the scanner electrodes,
    (ii) a first input circuit connected to the stop signal generating means, and
    (iii) a second input circuit connected to the manually operable signal generating means
whereby a signal received by the first input circuit causes the flip-flop to assume a first operating state wherein the output circuit has a low impedance and whereby a signal received by the second input circuit causes the flip-flop to assume a second operating state wherein the output circuit has a high impedance.

4. The apparatus of claim 1 wherein the activating means comprise:
  (a) means for preventing the operation of the analyzing means; and
  (b) means for inhibiting the operation of the preventing means when a start signal is received from the start signal generating means.

5. The apparatus of claim 1 comprising in addition: means for de-activating the analyzing means when the scanner electrodes are de-energized.

6. A particle analyzer, for studying particles suspended in a fluid, comprising:
  (a) fluid suspended particle scanning means for generating electric scanner signals, each signal having a parameter which is a function of a physical property of a respective scanned particle, incorporating a pair of scanner electrodes;
  (b) liquid manometer means in hydraulic connection with the scanning means for metering the volume of fluid scanned during the period of an analytic run, the manometer means containing
    (i) a metering section,
    (ii) a start electrode, and
    (iii) a stop electrode,
the start and stop electrodes being located on the metering section and separated by a distance which is a function of the volume of fluid scanned during the period of an analytic run;
  (c) means for analyzing electric pulses generated by the particle scanner incorporating a counter for registering the number of pulses which have been analyzed to have a desired characteristic;
  (d) a source of electromotive potential;
  (e) a manually operable binary switch in circuit with the source;
  (f) a binary flip-flop having:
    (i) an output circuit connected in parallel circuit with the scanner electrodes,
    (ii) a first input circuit connected to the stop electrode, and
    (iii) a second input circuit connected in circuit with the manually operable switch;
  (g) means for preventing the operation of the counter; and
  (h) means for inhibiting the operation of the preventing means when a start signal is received from the start electrode
whereby an operator may actuate the switch before an analytic run to energize the scanner electrodes and whereby the passage of the manometer liquid by the start and stop electrodes at the beginning and end of an analytic run causes first the activation of the counter and then de-energization of the scanner electrodes.

7. The apparatus of claim 6 comprising the addition: means for de-activating the analyzing means when the scanner electrodes are de-energized,
the de-activating means having a signal input in circuit with the output circuit of the flip-flop.

8. In a particle studying device having means for analyzing scanner signals and fluid suspended particle scanning means for generating scanner signals incorporating a pair of scanner electrodes and means for metering the volume of fluid scanned during the period of an analytic run, the metering means containing means for generating a start signal at the beginning of an analytic run and means for generating a stop signal at the end of an analytic run, a control circuit comprising:
  (a) manually operable signal generating means;
  (b) means for energizing the scanner electrodes in response to a signal received from the manually operable signal generating means and for de-energizing the scanner electrodes in response to a stop signal received from the stop signal generating means; and
  (c) means for activating the analyzing means in response to a start signal received from the start electrode means
whereby the scanner electrodes are energized only before and during the period of an analytic run.

9. The apparatus of claim 8 wherein the manually operable signal generating means comprise:
 (a) a source of electromotive potential; and
 (b) a manually operable binary switch in circuit with the source
whereby an operator can select one of two signal potentials for transmission to the means for energizing and de-energizing the scanner electrodes.

10. The apparatus of claim 8 wherein the means for energizing and de-energizing the scanner electrodes comprise:
 (a) a binary flip-flop having;
  (i) an output circuit connected in parallel circuit with the scanner electrodes,
  (ii) a first input circuit connected to the stop signal generating means, and
  (iii) a second input circuit connected to the manually operable signal generating means
whereby a signal received by the first input circuit causes the flip-flop to assume a first operating state wherein the output circuit has a low impedance and whereby a signal received by the second input circuit causes the flip-flop to assume a second operating state wherein the output circuit has a high impedance.

11. The apparatus of claim 8 wherein the activating means comprise:
 (a) means for preventing the operation of the analyzing means; and
 (b) means for inhibiting the operation of the preventing means when a start signal is received from the start signal generating means.

12. The apparatus of claim 8 comprising in addition: means for de-activating the analyzing means when the scanner electrodes are de-energized.

13. In a particle studying device of the type described having means for analyzing scanner signals and fluid suspended particle scanner means for generating scanner signals incorporating a pair of scanner electrodes and liquid manometer means for metering the volume of fluid scanned during an analytic run, the manometer means containing a start electrode and a stop electrode in hydraulic spaced and sensing relation with respect to the manometer means so that the volume of liquid between the sensing points of the start and stop electrodes is a function of the volume of the fluid scanned, a control circuit comprising:
 (a) manually operable signal generating means;
 (b) means for energizing the scanner electrodes in response to a signal received from the manually operable signal generating means and for de-energizing the scanner electrodes in response to a stop signal received from the stop electrode; and
 (c) means for activating the analyzing means in response to the start signal received from the start electrode
whereby the scanner electrodes are energized only before and during the period of an analytic run.

14. The apparatus of claim 13 wherein the manually operable signal generating means comprise:
 (a) a source of electromotive potential; and
 (b) a manually operable binary switch in circuit with the source
whereby an operator may select one of two signal potentials for transmission to the means for energizing and de-energizing the scanner electrodes.

15. The apparatus of claim 13 wherein the means for energizing and de-energizing the scanner electrodes comprise:
 a binary flip-flop having;
  (i) an output circuit connected in parallel circuit with the scanner electrodes,
  (ii) a first input circuit connected to the stop electrode, and
  (iii) a second input circuit connected to the manually operable signal generating means
whereby a signal received by the first input circuit causes the flip-flop to assume a first operating state wherein the output circuit has a low impedance and whereby a signal received by the second input circuit causes the flip-flop to assume a second operating state wherein the output circuit has a high impedance.

16. The apparatus of claim 13 wherein the activating means comprise:
 (a) means for preventing the operation of the analyzing means; and
 (b) means for inhibiting the operation of the preventing means when a start signal is received from the start electrode.

17. The apparatus of claim 13 comprising in addition: means for de-activating the analyzing means when the scanner electrodes are de-energized.

18. In a particle studying device of the type described having fluid suspended particle scanning means for generating scanner signals incorporating a pair of scanner electrodes, liquid manometer means in hydraulic connection with the particle scanning means for metering the volume of fluid scanned during the period of an analytic run, the manometer means containing a metering section, a start electrode and a stop electrode, the start and stop electrodes being located in the metering section and separated by a distance which is a function of the volume of fluid scanned during the period of an analytic run; and means for analyzing electric pulses generated by the particle scanner incorporating a counter for registering the number of pulses which have been analyzed to have a desired characteristic; a control circuit comprising:
 (a) a source of electromotive potential;
 (b) a manually operable binary switch in circuit with the source;
 (c) a binary flip-flop having:
  (i) an output circuit connected in parallel circuit with the scanner electrodes,
  (ii) a first input circuit connected to the stop electrode, and
  (iii) a second input circuit connected in circuit with the manually operable switch;
 (d) means for preventing the operation of the counter; and
 (e) means for inhibiting the operation of the preventing means when a start signal is received from the start electrode
whereby an operator may actuate the switch before an analytic run to energize the scanner electrodes and whereby the passage of the manometer liquid by the start and stop electrodes at the beginning and end of an analytic run causes first the activation of the counter and then de-energization of the scanner electrodes.

19. The apparatus of claim 18 comprising in addition:
 means for de-activating the analyzing means when the scanner electrodes are de-energized,
 the de-activating means having a signal input in circuit with the output circuit of the flip-flop.

20. The combination recited in claim 2 wherein the analyzing means comprise counter means for indicating the number of particles having a desired characteristic comprising in addition:
 means for resetting the counter to zero in response to one of the signal potentials generated by the binary switch.

No references cited.

WALTER L. CARLSON, *Primary Examiner.*

C. F. ROBERTS, *Assistant Examiner.*